1,029,867. SPRING-WHEEL. FREDERICK HOMOLYA, Kenosha, Wis. Filed Apr. 11, 1911. Serial No. 620,431.

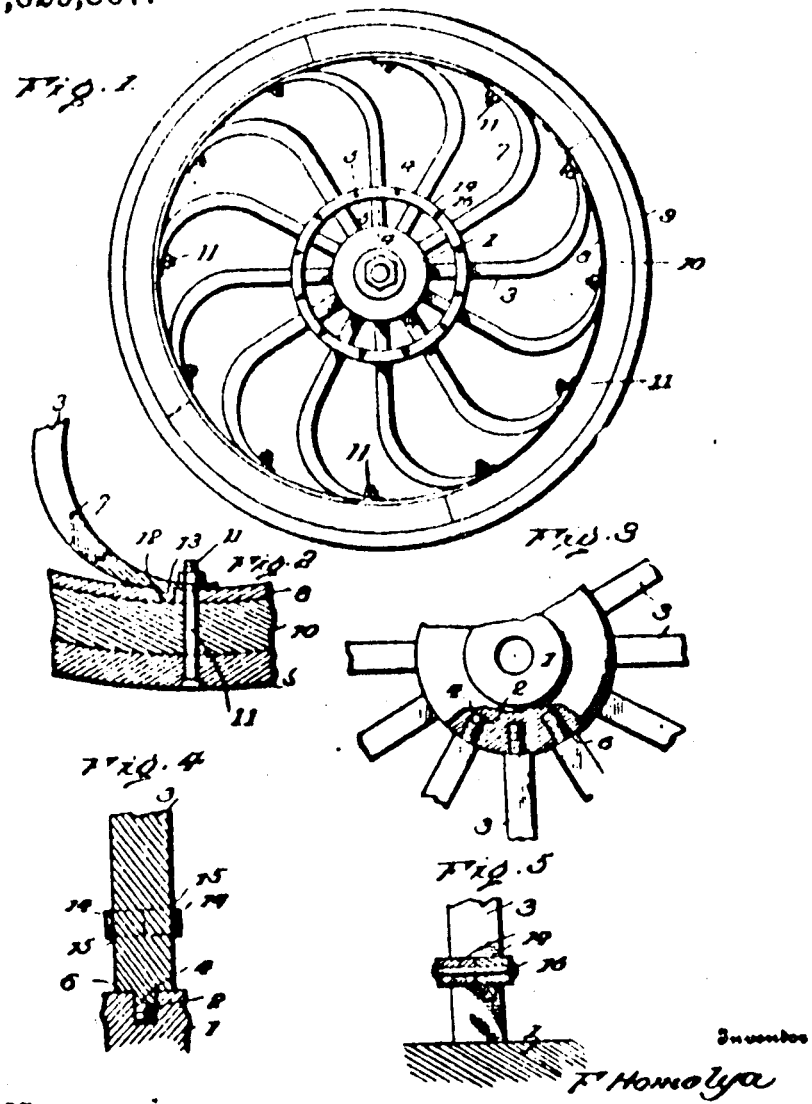

*To all whom it may concern:*

Be it known that I, FREDERICK HOMOLYA, a citizen of the United States, residing at Kenosha, in the county of Kenosha and State of Wisconsin, have invented certain new and useful Improvements in Spring-Wheels, of which the following is a specification.

It is the object of the present invention to provide an improved vehicle wheel of that type embodying resilient spokes as the cushioning elements, and the invention aims primarily to provide novel means for so securing the outer ends of the spring spokes to the rim of the wheel as to prevent snapping of the spokes at their points of attachment, and also to hold them against lateral displacement.

A further aim of the invention is to provide novel means for bracing the connection of the spokes at their inner ends to the wheel hub, so that should the vehicle supported by the wheels be suddenly started or stopped, the spokes will not be liable to be snapped off at their said inner ends.

The invention also aims to provide a novel rim for a wheel of this type which will render the wheel comparatively noiseless in travel.

For a full understanding of the invention reference is to be had to the following description and accompanying drawing, in which:—

Figure 1 is a view in side elevation of a vehicle wheel constructed in accordance with the present invention. Fig. 2 is a detail sectional view through a portion of the wheel rim and the outer ends of several of the wheel spokes. Fig. 3 is a similar view through a portion of the wheel hub and the inner ends of several of the spokes. Fig. 4 is a detail sectional view on the line 4—4 of Fig. 1. Fig. 5 is a similar view on the line 5—5 of Fig. 1.

Corresponding and like parts are referred to in the following description and indicated in all the views of the accompanying drawing, by the same reference characters.

In the drawing, the hub of the wheel is indicated by the numeral 1 and may be of any desired form, it being, however, formed with threaded sockets 2.

The spokes of the wheel are indicated by the numeral 3 and are of spring metal and are preferably of greater width than thickness. Each of the spokes at its inner end is reduced to form a stud 4 which is threaded and the formation of this stud results in a relatively wide-shoulder 6 which, when the stud is threaded into its socket in the wheel hub, bears against the periphery of the hub and reinforces the engagement of the stud in its socket so that the stud will not be liable to snap when power is suddenly applied to the hub or the axle upon which it is mounted. Throughout the greater portion of their length, the spokes extend radially from the hub, but their outer portions are formed thinner than their first mentioned portions and are bowed, as shown in Fig. 1 of the drawing, and indicated by the numeral 7. The spokes are secured at their bowed outer ends to the rim of the wheel in a manner which will be presently explained.

The numeral 8 indicates the inner rim of the wheel, 9 the outer rim thereof, and 10 a felly of wood or other fibrous material, the said felly being disposed between the rims 8 and 9 and secured in place by means of bolts 11 which are secured through the two rims, the felly, and the outer end of the spokes 3, as is clearly shown in Fig. 2 of the drawing. At this point it may be remarked that the purpose of the felly 10 is to strengthen the rims 8 and 9 and to render the travel of the wheel over rough surfaces practically noiseless. The inner rim 8 is formed with a number of sockets 12, one located inwardly of the point of engagement of each bolt 11 through the rim, and studs 13 which are formed or secured upon the spokes 3, inwardly of the point of engagement of the bolts 11 therethrough, seat in the sockets 12 and serve effectually to prevent lateral displacement of the spokes and to relieve the securing bolts 11 of strain. Without the provision of the studs 13 seating in the sockets 12, there would be a tendency upon sudden starting or stopping of the vehicle, supported by the wheels, for the spokes to snap off at the point of passage of the bolts 11 therethrough, or for the bolts to be sheared off.

In order to prevent snapping of the spokes at their inner ends, and to assist the studs 13 in holding the spokes against lateral displacement, due to any tendency of the studs 4 to unscrew from the sockets 2, there are provided rings 14 which are disposed against opposite sides of the spokes spaced from and concentric with respect to the hub 1, as clearly shown in Figs. 1 and 3 of the drawing, and these rings are formed in their opposite sides with notches 15 receiving the spokes. Bolts 16 are secured through the rings 14 between certain of the spokes 3 and the spokes are in this manner securely braced and held properly spaced at their inner ends. The spokes, being rectangular in cross-section and confined by the walls of the notches 15 in the two rings 14 they are effectually held against turning due to any tendency of their studs 4 to unscrew from the sockets 2. Also, as before stated, the provision of the rings 14 serves to prevent snapping of the spokes at their inner ends when the vehicle supported by the wheels is suddenly started or stopped.

Having thus described the invention what is claimed as new is:—

1. In a vehicle wheel, a hub, a rim, resilient spokes secured at their inner ends to the hub and disposed at their outer ends against the rim, bolts secured through the rim and the outer ends of the spokes, the rim being formed with sockets and studs upon the spokes, inwardly of the bolts, seating in the said sockets.

2. In a vehicle wheel, a hub, a rim, said hub being provided with threaded sockets, spokes having reduced threaded inner ends fitted in said sockets, the said spokes being secured at their outer ends to the rim and being rectangular in cross-section, rings disposed against opposing sides of the spokes and concentric to the hub and spaced therefrom and formed with rectangular notches receiving the spokes, and means securing the rings together between the spokes.

In testimony whereof, I affix my signature in presence of two witnesses.

FREDERICK HOMOLYA.

Witnesses:
 John P. Schutz,
 Henry W. Bienemann.